(12) United States Patent
Mechsner et al.

(10) Patent No.: US 7,494,043 B2
(45) Date of Patent: *Feb. 24, 2009

(54) METHOD FOR CONSTRUCTING A WELDED CONSTRUCTION UTILIZING AN AL-MG-MN WELD FILLER ALLOY

(75) Inventors: Klaus Alfons Mechsner, Neuwied (DE); Huibrecht Adriaan Wouters, Leiden (NL)

(73) Assignee: Aleris Aluminum Koblenz GmbH, Koblenz (DE)

( * ) Notice: Subject to any disclaimer, the term of this patent is extended or adjusted under 35 U.S.C. 154(b) by 404 days.

This patent is subject to a terminal disclaimer.

(21) Appl. No.: 11/247,592

(22) Filed: Oct. 12, 2005

(65) Prior Publication Data

US 2006/0081687 A1    Apr. 20, 2006

Related U.S. Application Data

(60) Provisional application No. 60/650,512, filed on Feb. 8, 2005.

(30) Foreign Application Priority Data

Oct. 15, 2004    (EP) .................................. 04077846

(51) Int. Cl.
  *B23K 35/28* (2006.01)
  *C22C 21/06* (2006.01)
  *B32B 15/20* (2006.01)

(52) U.S. Cl. .............................. 228/262.5; 219/146.22; 428/654; 420/541; 420/543

(58) Field of Classification Search .............. 228/262.1, 228/262.5, 262.51; 219/121.1, 121.13, 121.14
See application file for complete search history.

(56) References Cited

U.S. PATENT DOCUMENTS

| | | | |
|---|---|---|---|
| 2,106,827 A | 2/1938 | Brown | |
| 3,619,181 A | 11/1971 | Willey et al. | |
| 4,847,048 A | 7/1989 | Nishi et al. | |
| 5,055,257 A | 10/1991 | Chakrabarti et al. | |
| 5,908,518 A | 6/1999 | Hoffmann et al. | |
| 6,139,653 A * | 10/2000 | Fernandes et al. | 148/439 |
| 6,238,495 B1 | 5/2001 | Haszler et al. | |
| 6,337,147 B1 * | 1/2002 | Haszler et al. | 428/654 |
| 6,342,113 B2 | 1/2002 | Haszler et al. | |
| 6,383,314 B1 | 5/2002 | Dunbar et al. | |
| 6,416,884 B1 | 7/2002 | Haszler et al. | |
| 6,695,935 B1 | 2/2004 | Haszler et al. | |
| 7,383,713 B2 * | 6/2008 | Wouters | 72/258 |

FOREIGN PATENT DOCUMENTS

| | | |
|---|---|---|
| DE | 763165 | 12/1936 |
| EP | 0799900 | 10/1997 |
| EP | 1019217 | 7/2000 |
| FR | 2264095 | 10/1975 |
| GB | 2000806 | 1/1979 |
| JP | 449091 | 4/1969 |
| JP | 62224652 | 10/1987 |
| JP | 2205651 | 8/1990 |
| JP | 05169290 | 7/1993 |
| WO | 9917903 | 4/1999 |
| WO | 00/66800 | 11/2000 |

* cited by examiner

*Primary Examiner*—John J Zimmerman
(74) *Attorney, Agent, or Firm*—Novak Druce + Quigg LLP

(57) ABSTRACT

A method for constructing a welded construction, including the steps of: (a) providing separate component parts of the construction and (b) welding the separate parts together with an Al—Mg—Mn weld filler alloy having a good corrosion resistance and improved strength levels. The separate component parts having the following composition (in weight percent): Mg 4.9 to 6.0; Mn 0.6 to 1.2; Zn 0.25 to 1.5; Zr 0.05 to 0.25; Cr 0.3 max.; Ti 0.2 max.; Fe 0.5 max.; Si 0.5 max.; Cu 0.25 max.; Sc 0.3 max., balance inevitable impurities and aluminium. The Al—Mg—Mn weld filler alloy having the following composition (in weight percent): Mg 7.0-9.5; Mn 0.9-2.0; Zn 0.2-0.9 Zr$\leq$0.3; Cr$\leq$0.5; Sc$\leq$2.8; Cu$\leq$0.5; Fe$\leq$0.5; Si$\leq$0.5; Ti$\leq$0.3, the balance aluminium and incidental elements and impurities.

26 Claims, No Drawings

METHOD FOR CONSTRUCTING A WELDED CONSTRUCTION UTILIZING AN AL-MG-MN WELD FILLER ALLOY

CROSS-REFERENCE TO RELATED APPLICATIONS

This claims priority from U.S. provisional patent application Ser. No. 60/650,512 filed Feb. 8, 2005 and European patent application no. 04077846.6 filed Oct. 15, 2004, both incorporated herein by reference in their entirety.

FIELD OF THE INVENTION

The present invention relates to an Al—Mg—Mn weld filler alloy which is used for welding AlMg alloy members or structures which are used to construct large structures such as storage containers and vessels for marine and land transportation. Further, the invention relates to a welded structure which is produced by welding AlMg alloy members together with the Al—Mg—Mn weld filler alloy, thereby producing constructions such as transportation vessels, tanks, silos, tanker lorries, pressure vessels, bridges or trucks. Furthermore, the invention relates to a method for constructing such a welded structure or construction.

BACKGROUND OF THE INVENTION

Al—Mg—Mn weld filler alloys are known for use in large welded constructions which consist preferably of plates or extrusion members selected from the group of aluminium alloys of the AA5xxx-series. One of the standard weld filler alloys is the AA5183 alloy having the nominal composition, in weight %:

| | |
|---|---|
| Mg | 4.3 to 5.2 |
| Mn | 0.5 to 1.0 |
| Zn | 0.25 max. |
| Cr | 0.05 to 0.25 |
| Ti | 0.15 max. |
| Fe | 0.40 max. |
| Si | 0.40 max. |
| Cu | 0.10 max., | the balance substantially aluminium and incidental elements and impurities. AA5183 weld filler wire provides a good balance of high strength, corrosion resistance, bendability and weldability. By increasing the amount of magnesium in the alloy the strength of the weld joint can be increased. However, an increase in magnesium is usually accompanied by a decrease in corrosion resistance in this type of AlMg alloys.

Other disclosures such as JP-A-05169290 or GB-A-2000806 disclose weld filler alloys containing up to 6.0 weight % Mg up to 6.0 weight % Zn and up to 2.5 weight % Mn. The latter is disclosed in connection with a copper content of 0.2-0.5 weight %.

The proposed filler alloys are applied in welding techniques having a solidifying speed of higher than $1\text{-}3\times10^{2\circ}$ C./s wherein Zr may be incorporated more than the quantity of the solid solution. The above mentioned British patent application thereby mentions copper as a compulsory element.

EP-1019217-B1 discloses an Al—Mg—Mn weld filler alloy comprising essentially the following composition (in weight %):

| | |
|---|---|
| Mg | 5.0 to 6.5 |
| Mn | 0.4 to 1.2 |
| Zn | 0.4 to <2.0 |
| Zr | 0.05 to 0.3, | the balance essentially aluminium and incidental elements and impurities. The document discloses an improved strength compared with conventional AA5183 filler wire when welding a conventional AA5083 alloy plate under regular MIG welding conditions. The known weld filler alloy provides improved welded constructions with considerable improved corrosion resistance in the base material, the heat effected zone and the weld seam.

SUMMARY OF THE INVENTION

It is therefore a preferred object of the present invention to provide an Al—Mg—Mn weld filler alloy, preferably in the form of a weld wire, with which improved strength of welded aluminium alloy joints can be achieved as compared to those of the standard filler alloys such as AA5183 filler alloy or the filler alloy as mentioned in EP-1019217-B1.

It is another object of the present invention to provide an Al—Mg—Mn base weld filler alloy with improved ductility, bendability and a corrosion resistance which is at least as good as those of standard weld filler alloys such as AA5356 or AA5183.

It is another object of the present invention to provide a welded structure with AlMg alloy members which are welded with an improved weld filler alloy and which have improved strength levels after welding and a good corrosion resistance in the weld seam.

It is yet another object of the present invention to provide a method for constructing such a welded structure or welded construction.

The present invention preferably solves one or more of the above-mentioned objects.

DETAILED DESCRIPTION OF THE PREFERRED EMBODIMENTS

According to the present invention there is provided an Al—Mg—Mn weld filler alloy having a good corrosion resistance and improved strength levels, having the following composition (in weight %):

| | |
|---|---|
| Mg | 6.0 to 9.5 |
| Mn | 0.9 to 2.0 |
| Zn | 0.2 to 0.9 |
| Zr | $\leq 0.3$, preferably 0.05-0.25 |
| Cr | $\leq 0.5$ |
| Sc | $\leq 2.8$ |
| Cu | $\leq 0.5$ |
| Fe | $\leq 0.5$ |
| Si | $\leq 0.5$ |
| Ti | $\leq 0.3$, | the balance substantially aluminium and incidental elements and impurities, typically each <0.05, total <0.20.

In a preferred embodiment the Al—Mg—Mg weld filler alloy has a composition consisting of (in weight %):

| | |
|---|---|
| Mg | 6.0 to 9.5 |
| Mn | 0.9 to 2.0 |
| Zn | 0.2 to 0.9 |
| Zr | ≦0.3, preferably 0.05-0.25 |
| Cr | ≦0.5 |
| Sc | ≦2.8 |
| Cu | ≦0.5 |
| Fe | ≦0.5 |
| Si | ≦0.5 |
| Ti | ≦0.3, | the balance substantially aluminium and incidental elements and impurities, typically each <0.05, total <0.20.

The invention has most successfully found that an increase in the magnesium content results in higher strength levels without a decreasing corrosion performance by selecting respective manganese levels and zinc levels. Throughout the weld filler alloy according to the present invention welded aluminium joints have a higher strength than the standard AA5183 welds and welds as disclosed in EP-1019217-B1, incorporated herein by reference in its entirety. Weld filler alloys in accordance with the present invention have been found to be very successful for welding aluminium structures of Al—Mg alloys to themselves or to other aluminium alloys.

In a preferred embodiment the weld filler alloy is provided in a form selected from the group consisting of wire, rod, or stick, and in this form preferably having a diameter in the range of 0.5 to 6.0 mm.

The present invention achieves its high strength levels by maintaining a good corrosion resistance throughout a good balance of an elevated magnesium content with adapted manganese and zinc contents. Magnesium is the primary strengthening element in the weld filler alloy. It has been found that it is possible to produce weld wires from the weld filler alloy having more than 6.0 wt. % and up to 9.5 wt. % wherein it is preferable to have an amount of Mg in a range of 7.0 to 9.5 wt. %, more preferably in the range of 7.5 to 8.5 wt. %. In another embodiment a Mg-content of 6.0 to 7.5 wt. % is preferred. By adjusting the manganese and zinc levels it was found that less cracking during casting and subsequent processing of the filler alloy could be achieved, while still providing a strength increase to the welded structures.

Manganese is an essential additive element to the filler wire. Mn in combination with Mg provides the strength to the welded joins. Manganese is present in an amount of 0.9 to 2.0 wt. %, and preferably in a range of 0.9 to 1.8 wt. %. These elevated manganese levels correspond with elevated magnesium levels and lead to the improved strength levels of the weld filler alloy.

Zn is an important additive for corrosion resistance of the weld seams, in particular when used for the welding of alloy products of the preferred composition defined above. It has been found that the amount of Zn is preferably in a range of 0.4-0.7 wt. %, preferably 0.45 to 0.7 wt. % when regular TIG-welding is applied, and a preferred range of 0.5 to 0.9 when regular MIG-welding is applied, in order to maintain a good weldability of the filler alloy and to provide a sufficient corrosion resistance.

Zr is important to also achieve a strength improvement in the weld seams. In addition Zr is important for resistance against cracking during welding and it has been found that a preferred range of Zr is in a range of 0.05 to 0.25 wt. % and more preferably 0.1 to 0.2 wt. %. Zr levels above 0.3 wt. % result in very coarse needle-shaped primary particles which cause unacceptable failures during wire drawing operation and therefore the Zr level should be kept below 0.3 wt. %.

Scandium in the weld filler alloy can be present in an amount of up to 2.8 wt. % which has the advantage of grain refinement during casting or welding and an additional increase in strength from $Al_3Sc$ precipitates. When added in combination with Zr, the preferred range for the Sc in the filler wire is 0.25 to 2.8 wt. %.

Ti is a known grain refiner element which may be present in a range of up to 0.3 wt. %, and a preferred range for Ti is 0.03 to 0.2 wt. %.

Each of iron and silicon are regular elements in weld filler alloys, and their presence should not exceed 0.5 wt. %, and preferably each of their content is not more than 0.25%.

As high Cu-levels give rise to deterioration of the pitting corrosion performance in the welded structure when using the weld filler alloy of the current invention, the Cu content in the filler alloy should not exceed 0.5 wt. %, and preferably it should not exceed 0.25%. The more preferred Cu level is <0.10 wt. %, and most preferably the Cu is present at levels <0.03 wt. %.

The balance is aluminium and inevitable impurities. Typically, each impurity should be present at 0.05% maximum and the total of impurities is 0.20. With regard to impurities content, it is preferable to limit the beryllium content to about 0.00008% or less.

In a particular embodiment of the filler wire according to the invention, the filler wire comprises, in wt. %:

| | |
|---|---|
| Mg | 6.0 to 7.5, and preferably 6.2 to 7.5 |
| Mn | 1.2 to 2.0, and preferably 1.25 to 1.8 |
| Zn | 0.2 to 1.0, and preferably 0.3 to 0.9, | and the other elements Zr, Cr, Sc, Cu, Fe, Si, Ti as described above.

In another particular embodiment of the filler wire according to the invention, the filler wire comprises, in wt. %:

| | |
|---|---|
| Mg | 7.0 to 9.5, and preferably 7.5 to 8.5 |
| Mn | 0.9 to 1.45, and preferably 0.9 to 1.25 |
| Zn | 0.2 to 1.0, and preferably 0.3 to 0.9, | and the other elements Zr, Cr, Sc, Cu, Fe, Si, Ti as described above.

Particular suitable alloy products, in the form of rolled, or extruded or forged products for the constructional parts, comprising the following composition (in weight %):

| | |
|---|---|
| Mg | 4.9 to 6.0, and preferably 5.0 to 5.6 |
| Mn | 0.6 to 1.2, and preferably 0.65 to 1.1 |
| Zn | 0.25 to 1.5, preferably 0.30 to 0.8, and more preferably 0.30 to 0.6 |
| Zr | 0.05 to 0.25 |
| Cr | 0.3 max. |
| Ti | 0.2 max. |
| Fe | 0.5 max., and preferably 0.25 max. |
| Si | 0.5 max., and preferably 0.25 max. |
| Cu | 0.25 max., and preferably 0.10 max. |
| Sc | 0.3 max., | the balance substantially aluminium and incidental elements and impurities, and typically each <0.05, total <0.15, may be welded while using the weld filler alloy of this invention.

In a further aspect the invention relates to a method for constructing a welded construction, comprising the steps of: (a) providing separate component parts of the construction having a composition as defined hereinabove, and (b) welding the separate parts together with the Al—Mg—Mn weld filler alloy according to this invention. Preferably the component parts of the construction are provided in the form of an extrusion, plate, sheet, forging or a combination thereof.

The foregoing and other features and advantages of the weld filler alloy according to the invention will become readily apparent from the following detailed description of three preferred examples.

EXAMPLES

Example 1

Three filler wires having the composition according to the invention have been cast and produced into 3 mm diameter rods suitable for TIG welding. The alloy compositions are listed in Table 1. For comparison the known AA5183 filler wire has been used.

With these filler wires 6.5 mm aluminium plate material in the H111 temper have been TIG welded using two welding passes. The composition of the plate material is listed in Table 2. The cross weld tensile properties have been tested using tensile testing ASME code for a gauge length of 32 mm, and the results are listed in Table 3.

TABLE 1

Chemical compositions filler wires in weight percentages.

| Wire | Cu | Mn | Mg | Cr | Zn | Ti | Zr |
|---|---|---|---|---|---|---|---|
| A | <0.04 | 0.9 | 7.9 | <0.01 | 0.5 | 0.01 | 0.14 |
| B | <0.04 | 1.0 | 7.7 | <0.01 | 0.5 | 0.01 | 0.14 |
| C | <0.04 | 1.4 | 8.2 | <0.01 | 0.5 | 0.01 | 0.14 |
| 5183 | <0.04 | 0.66 | 4.4 | 0.08 | <0.05 | 0.10 | <0.01 |

TABLE 2

Chemical composition plate material in weight percentages.

| Cu | Mn | Mg | Cr | Zn | Ti | Zr |
|---|---|---|---|---|---|---|
| <0.02 | 0.9 | 5.3 | <0.01 | 0.6 | 0.01 | 0.10 |

TABLE 3

Cross weld tensile properties.

| Wire | PS [MPa] | UTS [MPa] | Elongation [%] |
|---|---|---|---|
| A | 148 | 326 | 21.4 |
| B | 162 | 342 | 22.0 |
| C | 160 | 340 | 18.0 |
| 5183 | 131 | 301 | 22.9 |

From the results of Table 3 it can be seen that for welded thin plate material when using the filler wire according to this invention compared to the use of conventional AA5183 filler wire an increase of more than 15 MPa in PS (Proof Strength) is obtained, and in the best results (filler B) of more than 30 MPa. The UTS (Ultimate Tensile Strength) increases by about 25 to 40 MPa.

Example 2

A filler wire has with composition according to the invention has been cast and produced into 6 mm diameter rods suitable for TIG welding. The alloy composition is listed in Table 4. For comparison the known AA5183 filler wire has been used.

With this filler wire 25 mm aluminium plate material in the H111 temper has been TIG welded using ten welding passes. The composition of the plate material is listed in Table 5. The cross weld tensile properties have been tested using tensile testing ASME code for a gauge length of 40 mm, and the results are listed in Table 6.

TABLE 4

Chemical compositions filler wires in weight percentages:

| Wire | Cu | Mn | Mg | Cr | Zn | Ti | Zr |
|---|---|---|---|---|---|---|---|
| D | <0.01 | 1.15 | 6.1 | <0.01 | 0.54 | 0.01 | 0.13 |
| 5183 | <0.01 | 0.65 | 4.4 | 0.08 | <0.01 | 0.10 | <0.01 |

TABLE 5

Chemical composition of the plate material in weight percentages:

| Cu | Mn | Mg | Cr | Zn | Ti | Zr |
|---|---|---|---|---|---|---|
| <0.01 | 0.75 | 5.3 | <0.01 | 0.5 | 0.01 | 0.10 |

TABLE 6

Cross weld tensile properties.

| Wire | PS [MPa] | UTS [MPa] | Elongation [%] |
|---|---|---|---|
| D | 153 | 324 | 20.5 |
| 5183 | 147 | 315 | 30.5 |

From the results of Table 6 it can be seen that for thick plate material an increase in UTS of about 10 MPa is reached compared to conventional 5183 filler wire.

Example 3

A filler wire with a composition according to the invention has been cast and produced into 3 mm diameter rods suitable for TIG welding. The alloy composition is listed in Table 7. For comparison the known AA5183 filler wire has been used.

With this filler wire 5 mm aluminium plate material in the H111 temper has been TIG welded using two welding passes. The composition of the plate material is listed in Table 8. The cross weld tensile properties have been tested using tensile testing ASME code for a gauge length of 20 mm, and the results are listed in Table 9.

TABLE 7

Chemical compositions filler wires in weight percentages.

| Wire | Cu | Mn | Mg | Cr | Zn | Ti | Zr |
|------|------|------|-----|-------|-------|------|-------|
| E    | <0.01 | 1.2  | 6.6 | <0.01 | 0.5   | 0.03 | 0.14  |
| 5183 | <0.01 | 0.65 | 4.4 | 0.08  | <0.01 | 0.10 | <0.01 |

TABLE 8

Chemical composition plate material in weight percentages.

| Cu    | Mn  | Mg  | Cr    | Zn  | Ti   | Zr   |
|-------|-----|-----|-------|-----|------|------|
| <0.01 | 0.8 | 5.3 | <0.01 | 0.5 | 0.01 | 0.12 |

TABLE 9

Cross weld tensile properties

| Wire | PS [MPa] | UTS [MPa] | Elongation [%] |
|------|----------|-----------|----------------|
| E    | 155      | 337       | 21.7           |
| 5183 | 146      | 329       | 30.3           |

From the results of Table 9 it can be seen that for thin plate material an increase in PS of about 10 MPa is reached compared to conventional 5183 filler wire.

Similar trends as presented in Example 1 to 3 have been found for plate material in an H321-temper.

It should be apparent that embodiments other than those described above come within the spirit and scope of the present invention. Thus, the present invention is not limited by the above description but is defined by the claims appended here to.

The invention claimed is:

1. A method for constructing a welded construction, comprising the steps of: (a) providing separate component parts of the construction having a composition comprising (in weight percent):

| Mg | 4.9 to 6.0 |
| Mn | 0.6 to 1.2 |
| Zn | 0.25 to 1.5 |
| Zr | 0.05 to 0.25 |
| Cr | 0.3 max. |
| Ti | 0.2 max. |
| Fe | 0.5 max. |
| Si | 0.5 max. |
| Cu | 0.25 max. |
| Sc | 0.3 max., | balance inevitable impurities and aluminium, and (b) welding the separate parts together with an Al—Mg—Mn weld filler alloy having a good corrosion resistance and improved strength levels, comprising the following composition (in weight percent):

| Mg | 7.0-9.5 |
| Mn | 0.9-2.0 |
| Zn | 0.2-0.9 |
| Zr | ≦0.3 |
| Cr | ≦0.5 |
| Sc | ≦2.8 |
| Cu | ≦0.5 |
| Fe | ≦0.5 |
| Si | ≦0.5 |
| Ti | ≦0.3, | the balance aluminium and incidental elements and impurities.

2. Method according to claim 1, wherein the component parts are provided in the form of an extrusion, plate, sheet, forging or a combination thereof.

3. Method according to claim 1, wherein the component parts have a Zn content in the range of 0.25 to 0.8 wt. %.

4. Method according to claim 1, wherein the component parts have a Zn content in a range of 0.30 to 0.6 wt. %.

5. Method according to claim 1, wherein the component parts have a Zn content in a range of 0.30 to 0.8 wt. %.

6. Method according to claim 1, wherein the component parts have a Mg content in a range of 5.0 to 6.0 wt. %.

7. Method according to claim 1, wherein the component parts have a Mg content in a range of 5.0 to 5.6 wt. %.

8. Method according to claim 1, wherein the component parts have a Mn content in a range of 0.65 to 1.2 wt. %.

9. Method according to claim 2, wherein the component parts have a Mn content in a range of 0.65 to 1.1 wt. %.

10. Method according to claim 2, wherein the component parts are welded by means of TIG welding and the Al—Mg—Mn weld filler alloy has a Zn content in a range of 0.4 to 0.7 wt. %.

11. Method according to claim 2, wherein the component parts are welded by means of TIG welding and the Al—Mg—Mn weld filler alloy has a Zn content in a range of 0.45 to 0.7 wt. %.

12. Method according to claim 2, wherein the component parts are welded by means of MIG welding and the Al—Mg—Mn weld filler alloy has a Zn content in a range of 0.5 to 0.9 wt. %.

13. Method according to claim 1, wherein the Al—Mg—Mn weld filler alloy, comprises (in weight percent):

| Mg | 7.0 to 9.5 |
| Mn | 0.9 to 1.45 |
| Zn | 0.2 to 1.0. |

14. Method according to claim 1, wherein the Al—Mg—Mn weld filler alloy, comprises (in weight percent):

| Mg | 7.5 to 8.5 |
| Mn | 0.9 to 1.25 |
| Zn | 0.3 to 0.9. |

15. Method according to claim 1, wherein the Al—Mg—Mn weld filler alloy, comprises Zn in a range of 0.4 to 0.6 wt. %.

16. Method according to claim 1, wherein the Al—Mg—Mn weld filler alloy, comprises Zn in a range of 0.5 to 0.9 wt. %.

17. Method according to claim 1, wherein the Al—Mg—Mn weld filler alloy, comprises Sc in a range of 0.25-2.8 wt. %.

18. Method according to claim 1, wherein the Al—Mg—Mn weld filler alloy, comprises Zr in a range of 0.05 to 0.25 wt. %.

19. Method according to claim 1, wherein the Al—Mg—Mn weld filler alloy, comprises Zr in a range of 0.1 to 0.2 wt. %.

20. Method according to claim 1, wherein the Al—Mg—Mn weld filler alloy, comprises Ti in a range of 0.03 to 0.2 wt. %.

21. Method according to claim 1, wherein the Al—Mg—Mn weld filler alloy, comprises Fe in a range of not more than 0.25 wt. %.

22. Method according to claim 1, wherein the Al—Mg—Mn weld filler alloy, comprises Si in a range of not more than 0.25 wt. %.

23. Method according to claim 1, wherein the Al—Mg—Mn weld filler alloy, comprises a Cu content of <0.10%.

24. Method according to claim 1, wherein the Al—Mg—Mn weld filler alloy, comprises a Cu content of <0.03%.

25. Method according to claim 1, wherein the filler alloy is provided in a form selected from the group consisting of wire, rod, or stick.

26. Method according to claim 1, wherein the filler alloy is provided in a form selected from the group consisting of wire, rod, or stick, and having a diameter in the range of 0.5 to 6.0 mm.

\* \* \* \* \*